Patented Feb. 25, 1941

2,232,860

UNITED STATES PATENT OFFICE 2,232,860

CERAMIC BODY FOR SPARK PLUG INSULATORS

Taine G. McDougal, Albra H. Fessler, and Helen Blair Barlett, Flint, Mich., assignors to General Motors Corporation, Detroit, Mich., a corporation of Delaware No Drawing. Application January 7, 1939, Serial No. 249,726

4 Claims. (Cl. 106—12)

This is a continuation in part of our prior application Serial No. 50,243 filed November 16, 1935, now Patent No. 2,152,655, granted April 9, 1939.

This invention has to do with ceramic bodies especially adapted for use as spark plug insulators. We have found that compositions consisting principally of aluminum oxide and thorium oxide when finely ground, formed into bodies and sintered are converted into a non-porous ceramic product of such dense and compact structure as to result in an improvement in certain desirable physical characteristics, such as thermal efficiency, mechanical strength, electrical resistance at elevated temperatures, and resistance to thermal shock. When alumina recrystallizes at higher temperatures it has a tendency to contain gas vesicles or blebs, especially in the center of the individual crystals, even though it has been completely melted and allowed to crystallize from the molten state. The lower the temperature at which this recrystallization takes place, the greater the number of vesicles. Normally corundum crystals are nearly opaque as a result of this condition. Naturally the physical properties of completely clear crystals vary rather widely from those of the highly vesicular crystals which contain an appreciable volume of voids. We have found it possible to reduce these vesicles and to obtain homogeneous crystals by the addition of thorium oxide in substantial amount to alumina.

In our improved bodies thoria forms a eutectic with alumina, the eutectic composition being 60% alumina and 40% thoria. The physical properties of any combination of these oxides is the resultant of the physical properties of the individual components. Thus the addition of thoria to alumina results in higher specific gravity, higher thermal expansion and lower specific heat. Higher thermal expansion is of especial advantage in spark plugs in that the expansion of the insulator then more nearly approaches the expansion of the shell insuring a tight fit between insulator and shell and hence absence of leakage under all operating conditions.

Good results have been obtained with a thorium oxide content of from 6% to 50%. Such bodies are characterized by unusually high thermal efficiency. This quality increases with increased thoria content up to 20% and thereafter falls off. The improved bodies also possess superior electrical resistance at high temperatures. They are substantially free from breakage due to thermal shock and possess very good mechanical strength.

The improved insulators are manufactured by first grinding and thoroughly mixing the ingredients. The grinding is preferably carried to a point where all of the material is in the form of a fine powder capable of passing through screens of 325 mesh to the linear inch. The ingredients should be substantially free from alkali because of the deleterious effect of the latter on the electrical properties of the insulator. The insulators may be molded into shape with the aid of a suitable binding agent by the process described and claimed in Patent No. 2,122,960 granted to Karl Schwartzwalder on July 5, 1938; by pressing in rubber molds as described in Patent No. 2,091,973 granted to Albra H. Fessler and Ralston Russel, Jr. on September 7, 1937; by casting, or by any other of the known methods used in forming bodies from non-plastic materials. The first mentioned method has been found to be preferable because the resulting insulator usually possesses a smooth, glossy surface requiring no glaze.

The formed bodies are then fired to a suitable temperature to produce recrystallization, and this is usually accompanied by considerable shrinkage. The firing time and temperature must be controlled as in usual kiln practice so as to secure complete recrystallization and to avoid overfiring with resultant warpage or other injury to the product. Firing temperatures on the order of Orton Cone 35, (1785° C.) will be found satisfactory.

It may, in some instances, prove desirable to add to the composition small proportions, for example up to 5%, of a suitable flux such as talc or fluorspar to reduce the firing temperature. It may also prove desirable to add proportions of other eutectic forming materials such as cerium oxide, monazite sand, or zirconium oxide; or proportions of inorganic compounds forming solid solutions with alumina such as those described in copending applications Serial Nos. 134,124 and 134,125, now Patent No. 2,152,656, granted April 9, 1939, filed by Taine G. McDougal, Albra H.

Fessler and Karl Schwartzwalder on March 31, 1937; or proportions of inorganic materials forming compounds with alumina as described and claimed in Patent No. 2,120,338 granted to the same inventors on June 14, 1938.

We claim:

1. A spark plug insulator in the form of a dense, impervious body consisting of a sintered mixture of aluminum oxide and from 6 to 50% thorium oxide.

2. A spark plug insulator in the form of a dense, impervious body consisting of a sintered mixture of aluminum oxide and from 6 to 20% thorium oxide.

3. A spark plug insulator in the form of a dense, non-porous body consisting of aluminum oxide and from 6 to 50% thorium oxide, a portion of said oxides being combined in the form of a eutectic mixture.

4. A spark plug insulator in the form of a dense, impervious body consisting of a sintered mixture of aluminum oxide and from 6 to 50% thorium oxide, together with up to 5% of a ceramic flux.

TAINE G. McDOUGAL.
ALBRA H. FESSLER.
HELEN BLAIR BARLETT.